United States Patent

[11] 3,615,255

[72] Inventors Lester E. Patterson
 Grand Blanc;
 William L. Alley, Flushing; Michael R. Foster, Davison, all of Mich.
[21] Appl. No. 38,771
[22] Filed May 19, 1970
[45] Patented Oct. 26, 1971
[73] Assignee General Motors Corporation
 Detroit, Mich.

[54] CATALYTIC CONVERTER
 3 Claims, 2 Drawing Figs.
[52] U.S. Cl. .................................. 23/288 F, 60/29
[51] Int. Cl. .................................. F01n 3/14
[50] Field of Search .......................... 60/29, 30; 23/288 F

[56] References Cited
 UNITED STATES PATENTS
 3,054,664  9/1962  Purse ..................... 23/288 F Primary Examiner—Douglas Hart
Attorneys—Sidney Carter and Peter P. Kozak ABSTRACT: A catalytic converter having an outer cylindrical housing and an inner cylindrical element adapted to receive in spaced relationship thereto a flat cylindrical catalyst element and having three distinct manifold portions: an annular portion between the housing and the element, an inner portion above the catalyst element and a lower portion below and surrounding the catalyst element. The annular portion communicates with the inner portion through a plurality of holes in the inner element and the inner portion communicates with the lower portion through the catalyst element whereby exhaust gases entering the annular portion are distributed around and radially into the inner portion and then flow uniformly downwardly through the catalyst element and into the lower portion to be discharged from the converter.

PATENTED OCT 26 1971
3,615,255
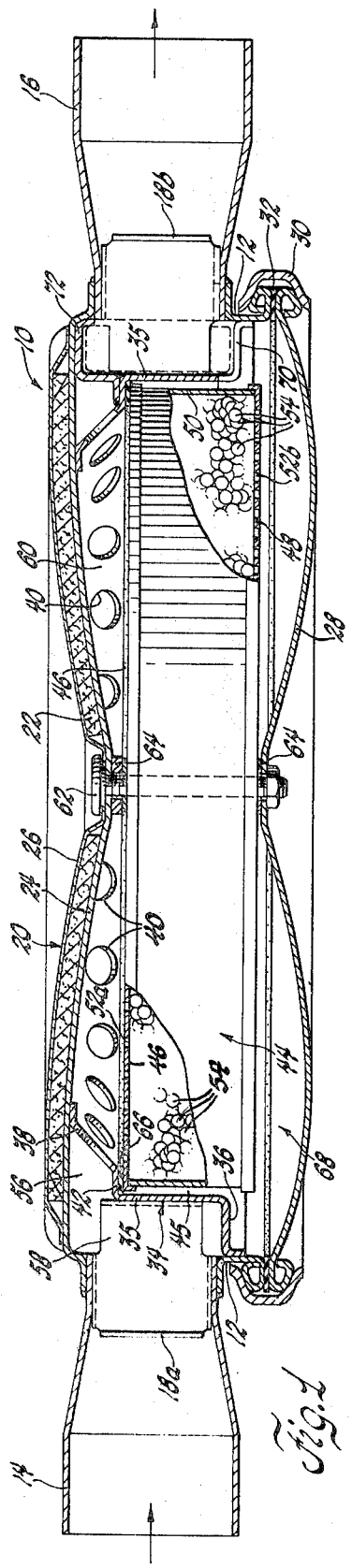
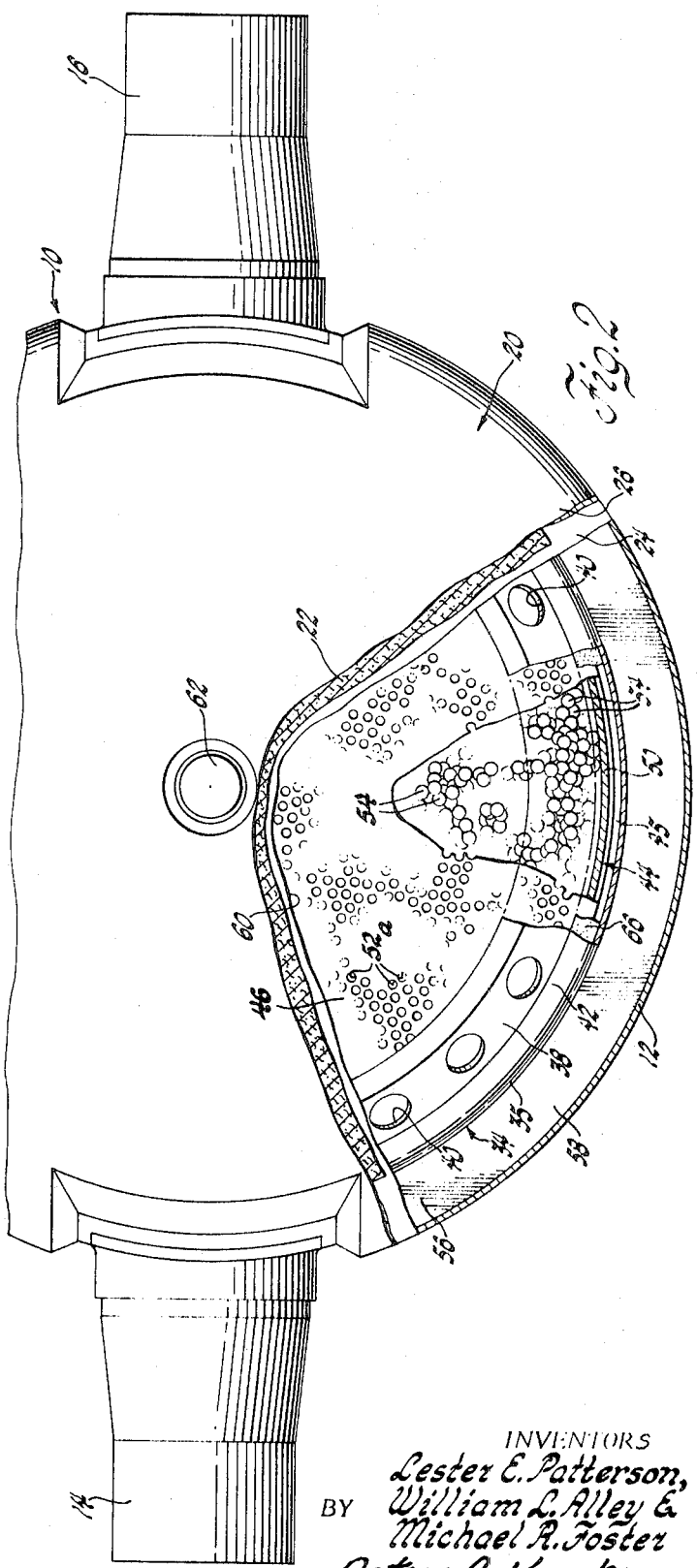
INVENTORS
Lester E. Patterson,
William L. Alley &
BY Michael R. Foster
Peter P. Kozak
ATTORNEY

CATALYTIC CONVERTER

This invention relates to the treatment of automotive exhaust gases from an internal combustion engine, and more particularly, to a catalytic converter for the conversion of the noxious constituents of exhaust gases of an internal combustion engine to a harmless form.

The desirability of treating exhaust gases of an internal combustion engine to convert the noxious constituents thereof, particularly carbon monoxide, unburned hydrocarbons and oxides of nitrogen to a harmless form is now well established. Of the various methods suggested for treating automotive exhaust gases, one of the most promising is the use of a catalytic converter. In automotive applications a catalytic converter having a catalytic element positioned therein is placed in the engine exhaust stream whereby exhaust gases from the engine pass into the converter and through the catalytic element which contains a catalytic material effective to oxidize CO and the unburned hydrocarbons to $CO_2$ and water and/or reduce the oxides or nitrogen to elemental oxygen and nitrogen before being released to the atmosphere.

There are numerous requirements to be met in providing a practical and effective catalytic converter. First, in converters employing a catalyst material in the form of spheres or pellets, it is necessary that the catalyst bed be kept tightly packed during operation to prevent attrition of the catalyst arising from both road vibration and fluidization of the catalyst bed by the exhaust gases flowing through the bed. Secondly, it is desirable that the flow of gases through the converter be uniform for maximum catalyst life and optimum conversion. Thirdly, back pressure in the exhaust stream caused by the restriction of flow of exhaust gases through the converter must be minimized in order to achieve proper engine operation. Fourthly, the converter must be so designed to prevent differential temperatures throughout the converter which lead to localized cracking and failure of the converter structure. Fifthly, the converter must be designed for easy placement in an automobile and for easy access for periodic removal and replacement of the catalyst element.

Accordingly, it is the principal object of this invention to provide an improved catalytic converter suitable for treatment of exhaust gases meeting the aforementioned requirements.

It is another object of our invention to provide a catalytic converter having inner and outer cylindrical members whereby exhaust gases entering the converter are dispersed annularly between the members so as to flow uniformly downwardly through a flat, cylindrical element containing tightly packed catalyst spheres effective to convert the exhaust gas to a harmless form whereby the uniform downward flow through a relatively shallow catalyst bed acts to keep the spheres tightly packed and results in a minimum back pressure in the exhaust stream with maximum catalyst life and optimum conversion.

In the preferred embodiment of our invention, these and other objects are accomplished by providing a catalytic converter having an outer cylindrical housing and an inner cylindrical element adapted to receive in spaced relationship thereto a flat, cylindrical catalyst element which housing and inner element define an annular manifold therebetween communicating with an inlet conduit for feeding exhaust gases into the manifold, the inner element and the catalyst element defining an inner manifold above the catalyst element communicating with the annular manifold through a plurality of holes in the inner element, whereby exhaust gases entering the converter are distributed around the annular manifold and, flow upwardly into the inner manifold and then uniformly downwardly through the catalyst bed wherein the conversion reactions take place to be collected in an outlet manifold surrounding the catalyst element and discharged from the converter through an outlet conduit communicating with the outlet manifold.

These and other objects and advantages will become apparent from the following detailed description of the invention, reference being had to the accompanying drawings of which:

FIG. 1 is a cross-sectional view of a catalytic converter, and

FIG. 2 is a sectional elevational view of same.

Referring now to the drawings, the catalytic converter shown in FIGS. 1 and 2 comprises, generally, a housing 10 formed preferably of a stainless steel or coated or plated steel effective to resist the corrosive attack of high-temperature gases and salts. The converter housing 10 comprises an outer cylindrical portion 12, an inlet conduit 14 for feeding exhaust gases into the converter and an outlet conduit 16 for discharging the treated gases from the converter extending radially from the cylindrical portion 12 and positioned 180° apart. It will be noted that the displacement angle between the conduits may be varied depending on the placement of the converter in the exhaust system. Conduit supports 18a and 18b attached to the cylindrical portion 12 are provided to support the conduits 14 and 16, respectively, in the housing. A top cover 20 is provided above the cylindrical portion 12 of the housing having a layer of insulation 22, for example a mineral wool, between the inner and outer top cover walls 24 and 26, respectively, and a removable bottom cover 28 is provided for access to the interior of the housing 10. A ring clamp 30 secures the bottom cover 28 against the cylindrical portion 12 and an annular seal 32 therebetween prevents gas leakage from the converter.

Within the housing 10 is an inner element 34 including a cylindrical portion 35 in spaced relation to the outer cylindrical portion 12, a radially extending portion 36 attached at one end to the lower portion of the cylindrical housing portion 12 and integrally attached at the other end to the inner cylindrical portion 35, conical baffle portion 38 which has a plurality of holes 40 therethrough attached to the inner wall 24 of the top cover 20 and a horizontally disposed flange portion 42 integrally connecting the baffle 38 to the cylindrical portion 35. The inner element 34 is adapted to receive a removable catalyst element 44 against the flanged portion 42 in spaced relationship to the cylindrical portion 35 thereby defining an annular space 45 therebetween.

The catalyst element 44 is a flat, cylindrical element having top and bottom plates 46 and 48, respectively, and a nonporous cylindrical rim 50 with each of said element plates 46 and 48 having a plurality of regularly spaced 1/16-inch perforations or louvers 52a and 52b, respectively, therethrough. Prior to assembly the catalyst element 44 is filled and tightly packed with a desired catalyst 54. The catalyst can be used in any form, but is preferably in a pelleted, extruded or spherical form with or without a support or carrier. Preferably, the catalyst is distributed on or impregnated in a support or carrier which may or may not contribute to the catalytic activity of the composite. Our invention is not limited to the use of any particular catalyst but includes the use of any suitable oxidation or reduction catalyst or catalyst capable of both oxidation and reduction which is effective at operating temperatures up to about 1600° F. over extended periods of time. It is desirable that the catalyst bed be relatively shallow to minimize back pressure in the exhaust system. For example, we have found that a bed of about 3-inch depth for an element having a diameter of about 12 inches performs adequately.

With the catalyst element 44 in place in the housing 10 there is defined an inlet manifold 56 having an outer annular portion 58 between the outer cylindrical portion 12 of the housing and the inner element 34 and an inner portion 60 between the top cover 20 of the housing, the top perforated plate 46 of the catalyst element 44 and the baffle portion 38. A bolt 62 with washers 64 located substantially centrally of the housing 10 and extending between the covers 20 and 22 substantially centrally through the element 44 holds the catalyst element 44 tightly against a flange seal 66 in sealing engagement with the flange portion 42 of the inner element 34. An outlet manifold 68 is defined between the bottom cover 28 and the inner element 34 extending to the flange seal 66 which seals the outlet manifold 68 from the inner manifold portion 60. The outlet manifold 68 includes the aforesaid annular space 45 extending around the catalyst element 44 between the cylindrical portion 34 and the nonporous rim 50 of the catalyst element whereby the catalyst element is, in effect, immersed or surrounded by the gases in the outlet manifold. The inlet conduit 14 communicates in fluid flow relationship with the outer annular portion 58 of the inlet manifold 56, and the outlet conduit 16 communicates in flow relationship with the outlet manifold 68 through an opening 70 in the annular portion 36 of the inner element 34 and is sealed from the annular manifold 58 by a sealing plate 72 surrounding the entrance thereto.

In operation, gases from an internal combustion engine are carried by the exhaust manifold (not shown) into the inlet conduit 14 and into the outer annular portion 58 of the inlet 56. The entering gases flow throughout the annular manifold in an annular path within the housing 10. As the gases flow around the annular manifold, they are forced upwardly and through the holes 40 in the baffle 38 and into the inner inlet manifold portion 60. It may be seen that the gases flow into the inner manifold 60 from substantially all radial directions and are thereby evenly distributed above the catalyst element 44. It may be further seen that the inwardly sloping configuration of the top cover 20 in relation to the horizontally disposed top plate 46 of the element 44 serves to maintain a uniform gas pressure across in the inner manifold portion 60. The gases then flow downwardly through the perforations 52a in the top plate 46 of the element 44 and pass through the catalyst bed 54 wherein the oxidation and/or reduction reactions take place. The treated gases then flow out through the perforations 52b in the bottom plate 48 of the catalyst element and are collected in the outlet manifold 68. The treated gases then flow into the outlet conduit 16 through the opening 70 in the inner element 34 and are discharged down the tailpipe to the atmosphere.

The catalytic reaction taking place in the catalyst bed is an exothermic reaction and, therefore, the temperature of the bed and of the treated gas rises from the heat of the reaction. As a result of the heated gases in the outlet manifold 68 circulating around the catalyst element 44 in space 45, the temperature of the bed is maintained and the temperature around the converter housing is equalized thereby preventing differential thermal stresses in the converter structure.

Catalysts typically used in exhaust gas converters usually do not become effective until the temperature of the catalyst has risen to about 250° F. As a result, there is a time lapse between the emission of exhaust gas from the engine on startup to when catalytic conversion of the gases begins through heating of the catalyst bed by the incoming exhaust gases. As previously stated, the catalytic reaction is an exothermic reaction and, therefore, the treated gases are heated to a temperature higher than the incoming gases in the converter structure. As may be seen, in our converter the catalyst element 44 is immersed in the treated exhaust gases in the outlet manifold 68 whereby the bed temperature is maintained. Furthermore, the incoming gases are heated by the treated gases through the portion of the inner member 34 which forms a common wall between the outlet manifold 68 including space 45 and the annular portion 58 of the inlet manifold 56. In this manner, on startup the incoming gases are quickly heated by the treated gases thereby decreasing the time before the catalyst bed reaches startup temperature and thereby increasing the efficiency of the converter.

Although our invention has been described in terms of a specific embodiment, it is to be understood that other forms may be adapted within the scope of the invention.

We claim:

1. An exhaust gas catalytic converter comprising, in combination, a housing comprising a cylindrical portion, radially extending inlet and outlet conduits, a top cover portion and a bottom cover portion, said cylindrical portion being adapted to receive a flat, cylindrical catalyst element having perforated top and bottom plates and having a horizontally disposed catalyst bed therebetween, means adapted to provide a seal between said catalyst element and said cylindrical portion, an annular baffle within said housing extending between said cylindrical portion and said top cover portion defining with said element an inlet manifold having an outer annular portion communicating with said inlet conduit and an inner portion, said seal means, said cylindrical portion, said element and said bottom cover portion defining an outlet manifold communicating with said outlet conduit, said outer annular portion communicating with said inner portion through a plurality of holes in said baffle whereby exhaust gases entering said outer annular portion are evenly distributed into said inner portion through said holes and whereby the flow of exhaust gases from said inner portion downwardly through said bed and into said outlet manifold is substantially uniform.

2. An exhaust gas catalytic converter comprising, in combination, a housing comprising a cylindrical portion, radially extending inlet and outlet conduits, a top cover portion and a bottom cover portion, a flat, cylindrical catalyst element having perforated top and bottom plates and having a horizontally disposed catalyst bed therebetween mounted in said housing, means adapted to provide a seal between said catalyst element and said cylindrical portion, an annular baffle within said housing extending between said cylindrical portion and said top cover portion defining with said element an inlet manifold having an outer annular portion communicating with said inlet conduit and an inner portion, said seal means, said cylindrical portion, said element and said bottom cover portion defining an outlet manifold communicating with said outlet conduit, said outer annular portion communicating with said inner portion through a plurality of holes in said baffle whereby exhaust gases entering said outer annular portion are evenly distributed into said inner portion through said holes and whereby the flow of exhaust gases from said portion downwardly through said bed and into said outlet manifold is substantially uniform.

3. A catalytic converter for treatment of exhaust gases of an internal combustion engine to remove the noxious constituents thereof comprising, in combination, an outer housing comprising a cylindrical portion, a radially extending inlet conduit for feeding exhaust gases into said converter, a radially extending outlet conduit for discharging the treated exhaust gases from said converter, a top cover portion and a bottom cover portion, an inner element comprising a cylindrical portion attached to said cylindrical portion of said outer housing through a radially extending portion of said element, a conical baffle portion attached to said top cover portion, and a horizontally disposed flange portion connecting said baffle portion to said cylindrical portion of said element, said baffle portion having a plurality of holes therethrough, said inner element being adapted to receive in spaced relationship to said cylindrical portion thereof a flat, cylindrical catalyst element having perforated top and bottom plates and a horizontally disposed catalyst bed therebetween, annular sealing means adapted to provide a seal between said catalyst element and said inner element at said horizontal flange portion and fastening means located substantially centrally of said housing extending between said covers substantially centrally of said element adapted to tightly engage said element against said seal, said cylindrical portion of said element being spaced apart from said cylindrical portion of said thereby defining an annular manifold communicating with said inlet conduit, said top plate of said element being spaced apart from said top cover portion of said housing thereby defining an inner manifold interiorly of said conical baffle portion, and said inner element and said catalyst element being spaced apart from said bottom cover portion, thereby defining an outlet manifold extending to said sealing means and communicating with said outlet conduit, said annular manifold communicating with said inner manifold through said holes in said baffle whereby exhaust gases entering said annular manifold are evenly distributed across said element top plate in said inner manifold whereby the flow of exhaust gases from said inner manifold downwardly through said catalyst bed and into said outlet manifold is substantially uniform.

* * * * *

PO-1050
(5/69)

UNITED STATES PATENT OFFICE
CERTIFICATE OF CORRECTION

Patent No. 3,615,255  Dated October 26, 1971

Inventor(s) Lester E. Patterson, et al

It is certified that error appears in the above-identified patent and that said Letters Patent are hereby corrected as shown below:

Column 2, line 29, after "portion 35," insert -- an inwardly slanting or --. Column 3, line 11, after "inlet" insert -- manifold --. Claim 2, line 31, between "said" and "portion" insert -- inner --. Claim 3, line 58, between "said" and "thereby" insert -- housing --.

Signed and sealed this 9th day of May 1972.

(SEAL)
Attest:

EDWARD M. FLETCHER, JR.
Attesting Officer

ROBERT GOTTSCHALK
Commissioner of Patents